United States Patent [19]

Wocher et al.

[11] 4,132,991

[45] Jan. 2, 1979

[54] METHOD AND APPARATUS UTILIZING TIME-EXPANDED PULSE SEQUENCES FOR DISTANCE MEASUREMENT IN A RADAR

[75] Inventors: Berthold Wocher, Leonberg; Thomas Pfendler; Heinz Pfitzemaier, both of Gerlingen, all of Germany

[73] Assignee: Robert Bosch GmbH, Stuttgart, Germany

[21] Appl. No.: 729,663

[22] Filed: Oct. 5, 1976

[30] Foreign Application Priority Data

Oct. 7, 1975 [DE] Fed. Rep. of Germany ....... 2544842

[51] Int. Cl.$^2$ ............................................. G01S 9/06
[52] U.S. Cl. .............................. 343/13 R; 343/17.1 R
[58] Field of Search ........................ 343/13 R, 17.1 R

[56] References Cited
U.S. PATENT DOCUMENTS

| 3,117,317 | 1/1964 | Kenyon | 343/13 R |
| 3,514,777 | 5/1970 | Woerrlein | 343/13 R X |

*Primary Examiner*—T.H. Tubbesing
*Attorney, Agent, or Firm*—Flynn & Frishauf

[57] ABSTRACT

Pulse sequences from a radar receiver respectively made up of successive start pulses and of successive echo pulses from one or more targets are expanded in time by multiplication with an auxiliary pulse sequence differing slightly in repetition rate from the start pulse sequence. This enables circuits to be used with a lower degree of time resolution that would otherwise be needed, at the cost of proportionally reducing the number of individual measurements of the target distance, a cost which is of no substantial consequence in an anti-collision radar where the closing rates are small compared to the pulse repetition rate. A time-expanded sequence of reference pulses is similarly produced from the oscillator controlling the repetition of the radar pulses and the auxiliary oscillator in order to make the measurements independent of signal propagation times within these circuits. The time-expanded pulses to be evaluated are differentiated and the null passage instant of the differentiated pulses is used to find the maximum amplitude of the pulses and to determine which pulses should be disregarded on the basis of amplitude discrimination. A range gate controlled with reference to the velocity of the vehicle in which the radar is mounted, in combination with certain other factors, is used to exclude interference from irrevalent targets.

8 Claims, 15 Drawing Figures

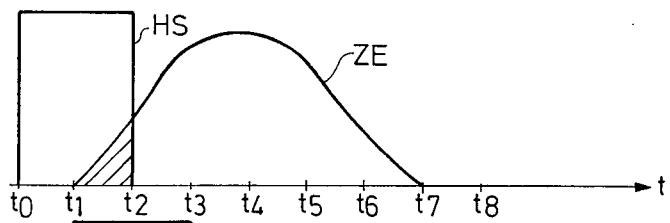
FIG. 4a
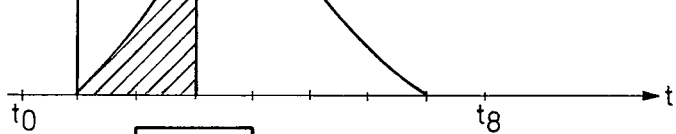
FIG. 4b
FIG. 4c
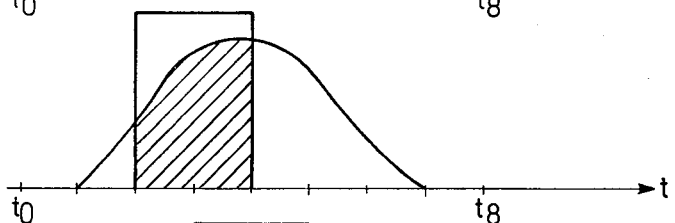
FIG. 4d
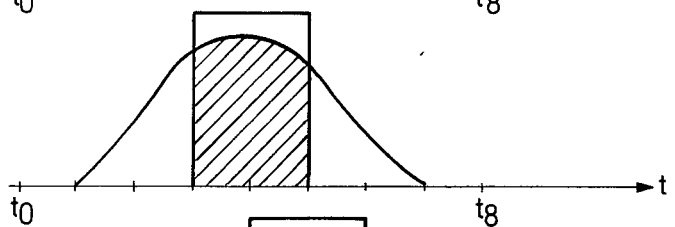
FIG. 4e
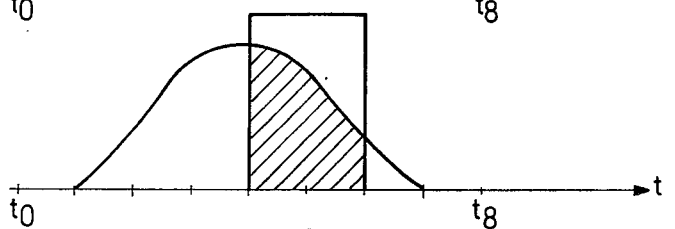
FIG. 4f
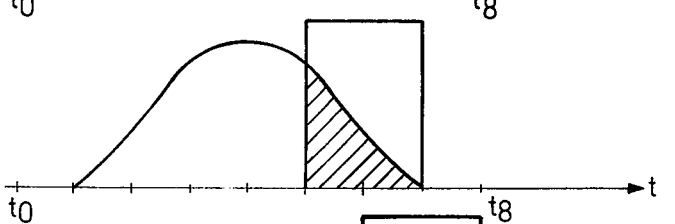
FIG. 4g
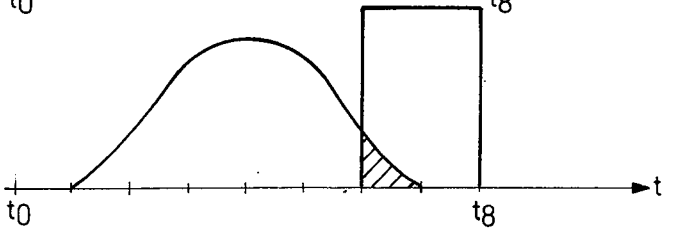

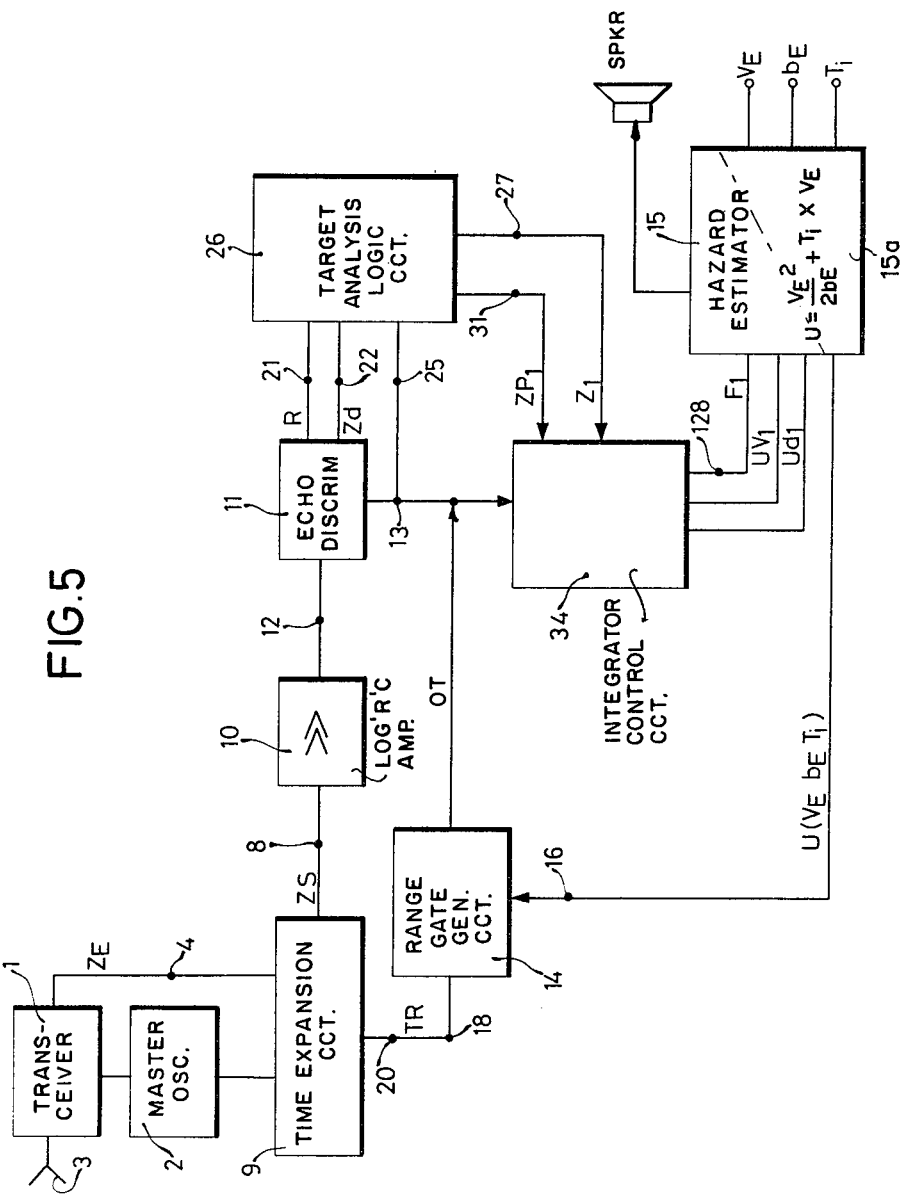

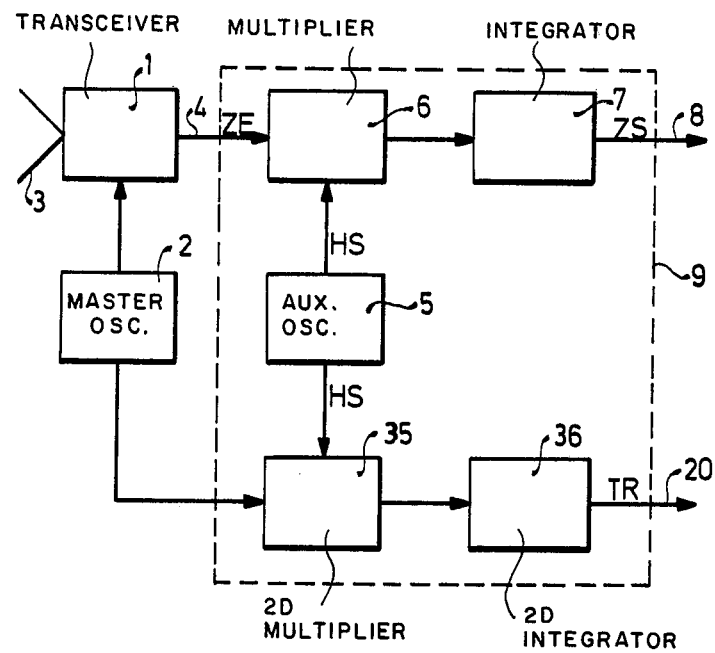

METHOD AND APPARATUS UTILIZING TIME-EXPANDED PULSE SEQUENCES FOR DISTANCE MEASUREMENT IN A RADAR

This invention relates to methods and apparatus for processing sequences of radar echo pulses each of which relate to an echo-producing target, and particularly for the constitution and operation of traffic radar systems installed in vehicles such as motor vehicles, boats, airplanes, rail vehicles or the like, for producing optically or acoustically perceptible warning signals upon approach to a target object, particularly another vehicle travelling in front of the radar equipped vehicle.

It is of course well known in radar system design and operation to measure the time lapse between the radiation of a transmitted radar pulse sent out over the radar antenna and the reception of a target-reflected pulse, generally received over the same antenna, in a time evaluation circuit from which the distance to one or more targets can be indirectly measured (of course, using the repetitive echo pulse sequences corresponding to reflection by the respective targets of the incident transmitted pulses).

Obstacle warning apparatus for motor vehicles are known that check the distance to an obstacle in the direction of travel and produce a signal upon determination of an obstacle distance that is less than an adjustable reference distance, the signal then setting off a warning indication, in which equipment, after the lapse of a period corresponding to the adjustable reference distance, the receiver of the device is blocked until the transmission of the next radar pulse (see German published patent application (AS) 1,555,781).

If it is desired to measure the distance to a target with greater accuracy, i.e. when a high distance resolution must be obtained, then it is necessary to operate with high time resolution for measuring the time lapse between the penetration of the locally transmitted pulse through a breakdown device into the receiving channel and the subsequent echo signals. In order to obtain the high time resolution, there are required very fast acting and correspondingly expensive electronic circuits. For example, for determination of the target distance with an accuracy of about 1 meter, it is necessary to distinguish time lapse differences in the order of magnitude of about 6.6 nanoseconds. Evaluation circuits that operate with such high accuracy can be produced at present only with very high technical complication and financial cost.

It is an object of the present invention to provide a method and an apparatus for evaluating radar echo pulses by which it is possible, by the use of relatively simple and therefore economical evaluation circuits, to obtain a high resolution capability in time and thereby in space.

SUMMARY OF THE INVENTION

Briefly, a sequence of radar echo pulses relating to a target is multiplied in an electronic multiplier with the pulses of an auxiliary pulse sequence of slightly different sequence frequency and the product signal thereby obtained is integrated to suppress high frequency signal components and to obtain a sequence of radar pulses expanded in time, after which the time-expanded sequence of radar pulses is subjected to evauation as if the pulses were directly received radar pulses.

In terms of apparatus, a pulse generator is provided to produce the auxiliary pulse sequence and this output and that of the radar receiver are multiplied in a multiplier circuit, the output of which is furnished to the input of an integrator, the output of which is supplied to a hazard estimator, which could also be referred to as a warning computer, which compares the target distance indicated by the integrator output with a critical distance that depends on at least one variable parameter of the operation of the vehicle in which the radar system is installed. When the detected distance becomes less than the critical distance, an alarm circuit or device is actuated.

Such a system of circuits is relatively simple and cheap to build and nevertheless provides a high accuracy of distance determination, so that, for example, upon installation of such a circuit system in a traffic radar system for determining the distance from an equipped automobile to other automobiles on a highway, distance can be accurately and quickly measured, particularly in order to provide a warning signal upon approach to a more slowly moving vehicle.

The echo signal processing according to the present invention has the advantage that it is possible to utilize target distance evaluation circuits of much lower time resolution capability than the kind of circuits that were formerly necessary. Taking account of the fact that, for instance, a time-spreading of the pulses of the signal pulse sequence by a factor of 100,000 is readily possible and, in some desired situations, is always desirable, it can be seen that the time resolution of the circuit will accordingly not lie any longer in the nanosecond region but rather in the millisecond region. In this manner quite a substantial simplification of the evaluation circuits is obtainable, so that the total cost for a vehicular pulse radar system can be substantially reduced even though additional circuits are necessary to produce the time spreading of the echo pulse sequences.

A further advantage of the kind of processing provided by the present invention is that a reduced bandwidth and therefore a notable gain with respect to noise and clutter is obtained for the time-expanded pulse sequences as the result of multiplication with the auxiliary pulse sequence and the following integration. Moreover, the correlation of the auxiliary pulse sequence with the echo pulse sequence simultaneously produces a suppression of aperiodic disturbing signals which is of particular significance in the evaluation of radar pulse sequences.

It is desirable to utilize auxiliary pulse sequences of a repetition rate that deviates very little from the repetition rate of the radar pulses, since this produces relatively large time expansion. It is therefore advantageous for the auxiliary pulse frequency to be lower than the radar pulse repetition rate since in this case the original sequential order of the pulses of the periodic radar pulse sequence is conserved also in the time-expanded echo pulse sequence.

The particular advantages of a time spreading of the pulses according to the invention will be readily apparent if a few typical operating parameters for a radar system, particularly a passive traffic radar system for avoidance of collision accidents are considered, which are of critical significance.

The following equation for the target distance holds basically for such a radar system:

$$a = 0.15 \times (m/ns) \times T_p \quad (1)$$

in which $T_z$ is the travel time of a pulse from the transmitter to the target and back to the receiver located at the transmitter site in a combined sending and receiving unit of the radar system.

By rearrangement of equation (1), there is obtained for the pulse travel time (echo interval):

$$T_z = 6.6 \times 10^{-3} \times (s/m) \times a \tag{1a}$$

If then it is desired to determine the distance with an accuracy of 1 meter, it follows from the above equations that the echo interval must be measured with an accuracy of 6.6 nanoseconds, as already mentioned. It is of course assumed for a time measurement of such accuracy that the transmitted pulses will have steep pulse flanks (extremely short rise and fall times), which can be produced only by operating at a high carrier frequency, for example between about 30 and 40 GHz, preferably keyed at a repetition rate of about 1 MHz.

It is further essential that the time lapse between the respective transmitted pulses and the reflected components of the transmitted pulses which return to the sending and receiving unit, i.e. the echo pulses, should be measured with a corresponding accuracy. This can be accomplished in a direct manner only with very expensive and complicated electronic time measurement circuits, for example by use of a fast counter. In contrast, if according to the invention a pulse duration expansion of the pulses of an echo pulse sequence is carried for a system operating at the same high carrier frequency, it is possible to operate with substantially simpler evaluation circuits for processing the pulses involved, which generally consist of a portion of the transmitter pulse that is superimposed upon the output of the radar receiver, on the one hand, and one or more echo pulses.

The operations involved in the generation of the pulse duration expanded pulse sequence by multiplication of the signal pulse sequence by the auxiliary pulse sequence can be visualized for understanding by noting that the pulses of the auxiliary pulse sequence shift in time relative to the individual pulses of the echo pulse sequence, with a time shift per transmission cycle corresponding to the difference between the pulse repetition rates, and that, since the auxiliary pulses are essentially rectangular pulses, the output can be regarded as made up of the portions of the signal pulses that coincide in time with the duration of an auxiliary pulse, this output being then integrated to produce a signal spread in time.

This relation can also be represented mathematically as set forth below. As the starting point for this representation there is the following equation that defines the relative shift time $T_A$ per cycle:

$$T_A = T_H - T_V = (1/f_H) - (1/f_V) \tag{2}$$

in which $T_H$ is the period of the auxiliary pulse sequence, $T_Z$ is the period of the echo signal pulse sequence, $f_H$ is the repetition rate or frequency of the auxiliary pulse sequence and $f_V$ is the repetition rate or frequency of the echo pulse sequence.

The pulses of the auxiliary pulse sequence run by the echo pulses more or less as a series of time windows, so that each single echo pulse, beginning with its leading edge, first increasingly falls in such a time window, until a maximum coverage of the time window is reached, after which the time overlap gradually decreases and finally reaches zero. The segments or strips of the echo pulses thus marked off from the remaining portions are then integrated to produce a time-expanded series of time-expanded pulses, expanded relative to the original echo pulse sequence by the factor $$k_D = (f_V/f_V - f_H) \tag{3}$$

It is advantageous for the duration of the pulses of the auxiliary pulse sequence to be equal to or less than the duration of the pulses of the echo pulse sequence, since in such cases there is a distinct maximum of the pulses of the time-expanded signal pulse sequence produced by integration, which makes possible a particularly simple subsequent evaluation, especially a differentiation of these pulses for determining the position of their respective maxima in time.

The invention is further described by way of example, in particular the example of an anti-collision radar system, with reference to the accompanying drawings, in which:

FIG. 4 is a timing diagram showing, on time axes a,b ... g to the same scale, successive stages of coincidence of an auxiliary pulse and an echo pulse;

FIG. 5 is a block diagram of a radar system embodying the present invention;

FIG. 6 is a block diagram of the time-expansion circuit of the radar system of FIG. 5;

PRINCIPLE OF THE TIME EXPANSION OF A PULSE SEQUENCE

Before the description of a practical radar system embodying the present invention is presented in detail, the principle of time expansion is explained briefly below with reference to FIGS. 1 to 4.

Figure 1:
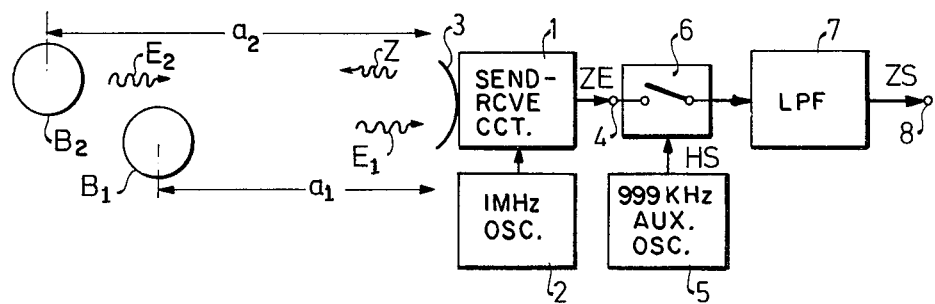
FIG. 1 is a block diagram of the essential parts of a pulsed radar system.

FIG. 1 is a block diagram of the essential portions of a pulse type radar system. A send-and-receive unit 1, that may simply be referred to as a transceiver, operates under the control of a master oscillator 2 that has an operating frequency of 1 MHz. The transceiver sends out transmitted pulses Z by means of the diagrammatically illustrated antenna 3 and, in this example, these pulses will succeed each other at a repetition rate of 1 MHz. The transmitted pulses Z in the illustrated case have a pulse duration of 20 ns and, for reasons that will be further explained below, are alternating voltage signals with a frequency of 35 GHz.

A transmitted pulse Z is graphically depicted in FIG. 1 with an arrowhead in front of its leading edge to indicate the direction of transmission, which is away from the antenna 3. The transmitted pulses Z can be partially reflected upon impingement on an obstacle. In FIG. 1 two such obstacles or targets $B_1$ and $B_2$ are shown. There are also shown one echo signal reflected from each of these targets, $E_1$ from $B_1$ and $E_2$ from $B_2$, the arrowhead in the drawing at the righthand extremity of these echo pulses $E_1$ and $E_2$ again showing the direction of travel, which in this case is toward the antenna 3. The echo pulses $E_1$ and $E_2$ are received by the antenna of the transceiver and result in the provision of output pulses at the receiver output 4 of the transceiver 1.

Figure 2:
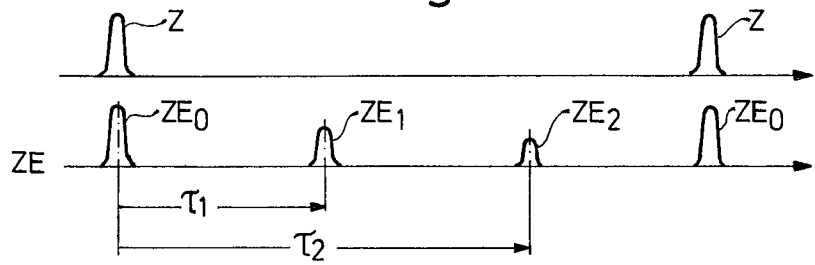
FIG. 2 is a timing diagram showing the relation of pulses transmitted and received by the radar system of FIG. 1.

FIG. 2 shows in the form of a timing diagram the transmitted pulses Z radiated from the antenna 3 during the time t and, on the line below, the signal impulse sequence ZE at the output 4 of the transceiver 1. It can be recognized that the signal pulse sequence ZE has three individual pulses within one period of the repetition rate of the transmitted pulses Z, namely a starting pulse $ZE_0$ which reaches the receiving side of the transceiver 1 by a coupling or overriding arrangement between the transmitting and receiving circuits of the transceiver and also two subsequent pulses $ZE_1$ and $ZE_2$ which correspond to the echo pulses $E_1$ and $E_2$ from the two targets $B_1$ and $B_2$ respectively, which echo pulses were, in general, detected and amplified and otherwise suitably prepared, for which reasons the pulses at the input of the transceiver 1 are differently designated than those appearing at the receiver output 4 of the transceiver.

The time lapse between the start pulse $ZE_0$ and the individual pulses $ZE_1$ or $ZE_2$, which are hereafter referred to as echo pulses for short, is dependent upon the travel time of these signals from the antenna 3 to the target $B_1$ or $B_2$ as the case may be and back to the antenna 3. These travel times are designated in FIG. 2 as $\tau_1$ and $\tau_2$ respectively.

In the case of electromagnetic waves that are propagated with the velocity of light, the following equation expresses the relation between the travel time $\tau$ and the target distance:

$$\tau = 6.6 \times 10^{-9} \times a \times (s/m) \tag{4}$$

The determination of the distances $a_1$ and $a_2$ of the respective targets $B_1$ and $B_2$ from the antenna 3 is indirectly obtained by measuring the travel time $\tau_1$ and $\tau_2$ respectively, the travel time being basically obtainable by processing the signal pulse sequence ZE.

From the equation (4) above, it is clear that the travel times must be measured with an accuracy of 6.6 ns if the distances $a_1$ and $a_2$ are to be measured with an accuracy of 1 meter. Since so high a resolution is most difficult to obtain by measurement of the time lapse, as explained above, there is provided according to the invention an auxiliary oscillator 5 that in the illustrated example operates at a frequency of 999 KHz. The auxiliary oscillator 5 serves to control a switch 6 that in practice is provided by an electronic gate circuit located at the input of a low-pass filter 7, at the output 8 of which a time-expanded pulse sequence ZS is obtainable.

The signal pulse sequence ZE to be evaluated is periodically keyed by the switch 6 that is controlled by the output signal HS of the auxiliary oscillator 5, with the keying frequency $f_H$ of the auxiliary oscillator 5 being smaller than the repetition rate $f_Z$ of the signal pulse sequence ZE and, furthermore, the duration or length $L_H$ of the pulses of the auxiliary oscillator 5 being equal to or smaller than the duration or length $L_Z$ of the transmitted pulses Z.

Under the conditions assumed above, there appears at the output 8 of the low-pass filter 7 the time-expanded signal pulse sequence ZS which is expanded in time by the factor $$k_D = (f_Z/f_Z - f_H) \tag{5}$$

The time-expanded signal pulse sequence ZS is accordingly of the following repetition frequency:

$$f_{ZS} = (f_Z/k_D) + f_Z - f_H \tag{6}$$

and the equation for the time-expanded travel time $\tau'$ is as follows:

$$\tau' = k_D \tau. \tag{7}$$

Figure 3:
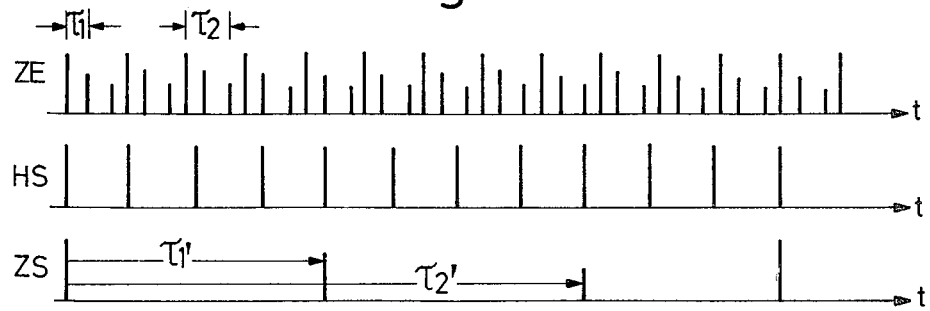
FIG. 3 is a timing diagram of pulse sequences present at various locations in the radar system of FIG. 1.

FIG. 3 of the drawings shows the time course of the unexpanded signal pulse sequence ZE, of the pulse sequence HS at the output of the auxiliary oscillator 5 and of the time-expanded signal pulse sequence ZS, the time axis being in this case on a smaller scale compared to FIG. 2 and the representation assuming, furthermore, a time-expansion factor $k_D = 12$, in order to make possible a more clear representation of the relation to be shown, although in practice the operation of the equipment works with a time-expansion factor $k_D = 1000$, as in the case of the frequencies specified above for the master oscillator 2 and the auxiliary oscillator 5. It can be seen that in FIG. 3 the length of one period of the time-expanded signal pulse sequence ZS is equal to the length of 12 periods of the unexpanded signal pulse sequence ZE at the output 4 of the transceiver 1. This means that in the case of a time-expansion factor $k_D = 1000$ instead of a time resolution capability of 6.6 ns, only a time resolution capability of 6.6 $\mu$s is needed. The manner in which the time-expanded signal pulse frequency ZE is generated appears particularly clearly in FIG. 4 where on the lines a,b . . . g representing the same time scale, there are drawn for several successive periods of the unexpanded signal pulse sequence ZE the position in time of an individual pulse of this sequence and that of successive pulses of the pulse sequence HS appearing at the output of the auxiliary oscillator 5, thus showing the relative overlap relations. In particular, line a of FIG. 4 shows a starting condition for a time interval $t_0$ to $t_8$. Within this time interval, the output pulse HS of the auxiliary oscillator 5, shown as a rectangular pulse, has the duration from $t_0$ to $t_2$, whereas the individual pulse of the signal pulse sequence ZE that is shown, represented as a bell-shaped pulse, stretches over the time interval $t_1$ to $t_7$. The two pulses overlap each other in the time interval $t_1$ to $t_2$. During this time interval the switch 6 in the illustrative embodiment shown in FIG. 1 would be closed, so that the shaded portion of the signal pulse under consideration would be passed on to the low-pass filter 7.

During the next period of the signal pulse sequence ZE the rectangular pulse from the auxiliary oscillator 5, according to the assumption that the time shift per cycle $T_A$ is given by the equation (3) is equal to a time interval $t_n$ to $t_{n+1}$, now appears in the time interval $t_1$ to $t_3$, so that the portion of the echo signal pulse appearing in this time interval is passed on to the low-pass filter this time, as shown in line b of the figure.

As the result of the relative shift of the pulses of the two sequences, there are then passed on to the low-pass filter during the next five periods of the signal pulse sequence ZE the signal portions shown shaded in lines c to g, inclusive, of FIG. 4. In the next period, which follows the period considered in line g of FIG. 4, there is, however, no overlap any more between an individual pulse of the unexpanded signal pulse sequence ZE and the pulse sequence HS from the output of the auxiliary oscillator 5. This means that no more signal components are supplied to the low-pass filter 7 until some future time when another overlap begins between an output pulse of the auxiliary oscillator 5 and another pulse of the signal pulse sequence ZE. The above explanation makes clear that during several successive periods signal portions of an individual pulse of the signal pulse sequence ZE arriving from the output 4 of the transceiver 1 are supplied through the switch 6 to the low-pass filter 7. These signal portions coming out of the low-pass filter 7 are then integrated to form a single pulse of the time-expanded signal pulse sequence ZS, which, by a suitable dimensioning of the low-pass filter, is again in the form of a bell-shaped pulse, particularly if the portions of the signal allowed to pass by the switch 6 have the relation corresponding to the illustration in FIG. 4, progressing from 0 to a maximum value and then decreasing again down to zero.

It should here be noted that it has been found that in a radar system operating with the specified frequencies, the unexpanded signal pulse sequence ZE runs sufficiently periodically in spite of the varying target distances $a_1$ and $a_2$, to make possible trouble-free operation with the time-expanded signal pulse sequence ZS. It has further been found that the performance of distance measurements at time spacings of 1 $\mu$s suffices to monitor the traffic situation, since the displacement in 1 $\mu$s of a vehicle moving at 200 km/h, for example, amounts to only 56 $\mu$m. Finally, the integration operation involved in the generation of the time-expanded signal pulse sequence ZS has also proved favorable with respect to the suppression of a periodically appearing disturbance signals, which signifies that a better noise margin is obtained while at the same time erroneous measurements on the basis of the disappearance of one or more echo signals are excluded, because for a suitably chosen cycle-to-cycle shift time $T_A$ makes it hardly perceptible in practice when a few individual echo signals are missing.

DETAILS OF AN ILLUSTRATIVE RADAR SYSTEM

Now that the principle of time expansion has been explained with reference to FIGS. 1–4, a pulse radar system constructed in accordance with the invention will now be described with reference to FIG. 5 of the drawings, in terms of its manner of operation and of the details of the subassemblies constituting the system, without actually going into the details of the circuits provided within the subassemblies. The system illustrated in FIG. 5 has a transceiver unit 1 and an antenna 3 provided the usual way. The transceiver 1 can be built in a known way and since its construction and characteristics are not a part a part of the present invention, it does not need to be explained further here. The output 4 of the transceiver unit 1 at which is provided the unexpanded signal pulse sequence ZE, is connected with a time expansion circuit 9. Another input of the time expansion circuit 9 is supplied with the output signal of the master oscillator 2, which controls the transmission of pulses by the transceiver unit 1 and actually is a component of the transceiver, although it is separately represented in FIGS. 1 and 5 for ease of understanding the diagram.

The time expansion circuit 9 has a first output 8 at which the time expanded signal pulse sequence ZS, which is to be evaluated for further processing, is available. This pulse sequence is supplied to an amplifier 10 that is preferably constituted as a logarithmic amplifier, of which the output is connected with a first input 12 of an echo discriminator 11. A second input 13 of the echo discriminator 11 is connected to a range gate signal OT which is generated by a range gate control circuit 14. The range gate control circuit 14 generates the range gate signal in dependence upon the speed $v_E$ of the vehicle which is equipped with the radar system shown and also in dependence on the maximum braking $b_E$ of this vehicle and in dependence on the the individual reaction $T_i$ of the driver of the same vehicle. The voltage corresponding to the parameters just named, $b_E$, $v_E$ and $T_i$, which voltage may be designated U ($b_E$, $v_E$, $T_i$) is supplied to the range gate control circuit through its input 16. At another input 18 there is provided to the range gate control circuit 14 a time-expanded, limited reference signal TR coming from the second output 20 of the time expansion circuit 9, regarding the purpose and manner of generation of which more will be mentioned below. At this stage of the description it is sufficient to say that the reference signal TR has a fixed time relation relative to the transmitted pulses Z radiated from the antenna 3.

The range gate control circuit 14, in response to a signal provided to its input 16, produces a range gate signal of variable length, by means of which those pulses of the time expanded signal pulse sequence ZE are supressed in the echo discriminator 11 which arise from reflection outside of the range limit determined by the range gate control circuit. The echo discriminator 11 serves to produce a limited time expanded signal pulse sequence R from which there have been eliminated not only pulses arriving too late, but also pulses that do not reach a predetermined voltage level and are thereby deemed to be disturbance pulses. The echo discriminator 11 also produces a differentiated time expanded signal pulse sequence Zd, the individual pulses of which mark the position of the maxima of the pulses of the time expanded signal pulse sequence ZS. The pulse sequences R and Zd produced by the echo discriminator 11 are provided at the outputs of the latter designated 21 and 22 respectively. The limited signal pulse sequence R, the differentiated signal pulse sequence Zd and the range gate signal OT are supplied to the inputs 21, 22 and 25, respectively, of a target analysis logic circuit 26, which serves to produce length modulated output pulses $Z_1$, the length of which corresponds to the travel time of the respective echo pulses. The length modulated output signals $Z_1$ appear at an output 27 of the target analysis logic circuit 26, which also has an output 31 at which signals $ZP_1$ are provided which appear at the end of every $Z_1$ pulse.

The outputs 27 and 31 of the target analysis logic 26 are connected with inputs of an integrator control circuit 34, to which also the range gate signal OT is supplied. The integrator control circuit 34 operates, as broadly stated, to make a decision whether, on the basis of the distances determined from the evaluated echo pulses, results should be stored as new measured values and, if appropriate, utilized to initiate a warning system or whether, instead, they should be regarded as pulse measurements which should be at least preliminarily suppressed. In its overall operation the integrator control circuit 34 thus serves to prevent an unnecessary initiation of a warning signal by transitory false measurements. The integrator control circuit 34 delivers three output signals, namely $F_1$, $Uv_1$ and $Ud_1$.

These signals are supplied, as shown in FIG. 5 to a hazard estimator 15 by which warning signals which may be optical and and/or acoustic as may be appropriate, are furnished to the driver of the vehicle equipped with the radar system in question.

The hazard estimator 15 also has a circuit portion 15a for generating a voltage U ($v_E$) which is proportional velocity $v_E$ of the vehicle in which the equipment is installed and for generating the voltage U ($v_E$, $b_E$, $T_i$), which is supplied to the input 16 of the range gate control circuit 14 as already described.

TIME EXPANSION CIRCUIT

FIG. 6 of the drawings is a block diagram of the time expansion circuit 9 of the radar system of FIG. 5, with the transceiver unit 1 of the radar system and its master oscillator 2 also shown. The time expansion circuit 9 corresponds in its basic construction to the circuit for time expansion of a pulse sequence described with reference to the basic diagram given in FIG. 1, but the circuit FIG. 6 is in comparison somewhat more elaborate.

As in the case of FIG. 1, the signal pulse sequence ZE appearing at the output 4 of the transceiver 1 in FIG. 6 is supplied to a multiplier circuit 6 that can be a controlled switch as in FIG. 1 and is hence designated with the same reference numeral. The multiplier can also be a ring modulator, for example, or some other suitable electronic multiplier circuit. A second input of the multiplier 6 is provided with the auxiliary pulse sequence which is furnished at an output of the auxiliary oscillator 5. The output of the multiplier circuit 6 is supplied to an integrator 7, that may again be a low pass filter, for example, and is therefore designated with the same reference numeral as the low pass filter in FIG. 1. On the other hand, the integrator 7 may also be an operational amplifier provided with a capacitive feedback connection. At the output of the integrator 7, which constitutes the first output 8 of the time expansion circuit, the time expanded signal pulse sequence ZS is made available to succeeding circuits.

In principle, it would appear to be possible to derive a reference pulse sequence from the time expanded signal pulse sequence ZS to serve as a reference frequency or time standard for the further processing of the time expanded signals. It has been found better, however, as shown in FIG. 6, to provide the output signals of the master oscillator 2 and of the auxiliary oscillator 5 to a second multiplier 35, of which the output is connected to a second integrator 36, at the output of which a reference pulse sequence TR is available that is derived directly from the output signals of the two oscillators 2 and 5. This reference pulse sequence is shown in FIG. 6 as coming out of the second output 20 of the time expansion circuit 9. It is again assumed that the oscillators 2 and 5 operate at frequencies of 1 MHz and 999 KHz respectively. In the manner shown in FIG. 6 a highly accurate reference signal is obtained, which makes possible an exceptionally precise measurement of echo time and hence of distance.

RANGE GATE CONTROL

The time expanded reference pulse sequence TR is connected from the second output 20 of the time expansion circuit 9 to the input 18 of the range gate control circuit 14, which will now be described in detail with reference to FIG. 7.

Figure 7:
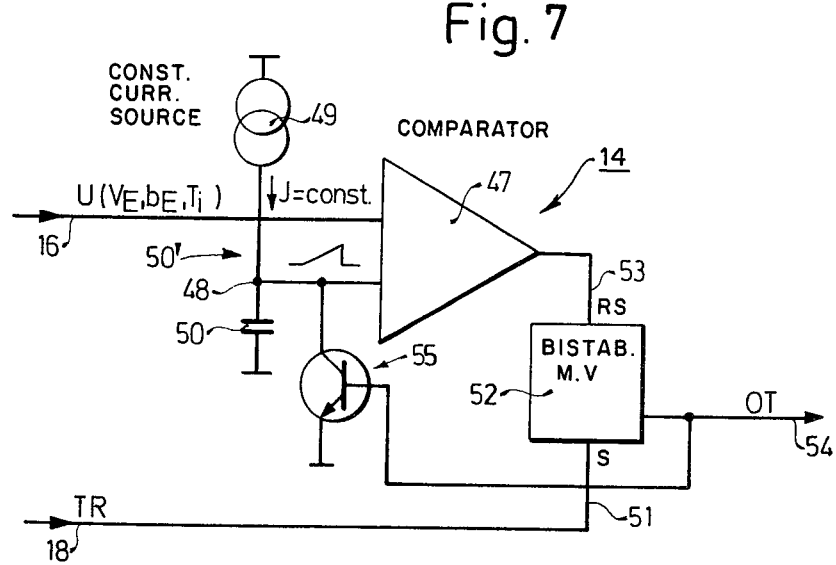
FIG. 7 is a circuit diagram of a controlled range gate of the radar system of FIG. 5.

In addition to the input 18 mentioned, the second input 16 of the range gate control circuit 14 is shown in FIG. 7 at which the voltage U ($v_E$, $b_E$, $T_i$) is provided. That voltage is supplied to one input of a comparator 47, of which the other input is connected to the common connection point 48 of a constant current source 49 at a capacitor 50. The other terminal of the capacitor 50 is connected to reference potential, that is, to the circuit chassis ground or some other equivalent potential which will not vary with the amount of currents going into or out of connection to such potential.

The reference signal TR from the input 18 of the circuit is supplied to the "set" input 51 of a bistable circuit (multivibrator) 52, of which the "reset" input 53 is connected to the output of the comparator 47. The bistable circuit 52 has an output 54 at which the range gate signal OT is supplied. The output 54 is also furnished to the base of a transistor 55, of which the collector-emitter path is connected in parallel to the capacitor 50, the emitter being grounded to reference potential. The constant current source 49, the capacitor 50 and the transistor 55 thus form a saw-tooth wave generator 50' controlled by the bistable circuit, so that it may be more properly said that the input of the comparator 47 which is connected to the circuit point 48 is supplied with saw-tooth voltage wave from the saw-tooth wave generator 50'.

The range gate control circuit 14 serves to limit the operating range of the radar system to a distance value that is sufficient for stopping the vehicle under conditions determined by the previously mentioned parameters $v_E$, $b_E$, and $T_i$, even when the object detected by the radar pulses is stationary. For the determination of the range limit, one may begin by considering the well-known equation for the so-called critical distance, that may be expressed as follows:

$$a_k = (v_E^2/2b_E) - (V_1^2/2b_1) + T_i \times v_E \qquad (8)$$

where $v_1$ is the speed and $b_1$ the maximum deceleration of braking of a vehicle proceeding ahead of the vehicle making the measurement. Starting with equation (8) there follows for a fully autonomous radar system in which no significant information whatever is available regarding to the behavior of the detected object, a minimum range or maneuvering field OT according to the following equation:

$$OT = (V_E^2/2b_E) + T_i \times v_E \qquad (8a)$$

The portion 15a of the hazard estimator 15 of the radar system of FIG. 5 serves to generate the voltage U ($v_E$, $b_E$, $T_i$) that is related with the input values corresponding to equation (8a). This voltage is compared with the voltage at circuit point 48 (FIG. 7), which is to say with the voltage across the capacitor 50, which is zero when the transistor 55 is conducting and rises linearly after the transistor is made nonconducting, as the result of the fixed and predetermined current strength I of the constant current source 49. The bistable circuit 52 of the range gate control 14 is set when a reference pulse of the sequence TR appears at the input 18. The setting of the bistable circuit 52 causes a voltage change at its output 54 that constitutes the leading edge of the range gate signal OT. This leading edge of the OT signal blocks the transistor 55, so that the capacitor 50 can be charged by the constant current source 49. As soon as the linearly rising voltage at the point 48 reaches the value of the voltage U ($v_E$, $b_E$, $T_i$) or slightly exceeds it, the output signal of the comparator 47 changes over. The comparator 47 can, for example, be an operational amplifier with very high gain. The consequent voltage change at the reset input 53 of the bistable circuit 52 has the result of producing another change in voltage, in the direction opposed to that of the previous change, at the output 54, this representing the trailing edge of the range gate signal OT.

When the trailing edge of the OT signal appears the transistor 55 is turned on, so that its collector-emitter path practically constitutes a short circuit, through which the capacitor 50 discharges. The range gate circuit 14 now remains in the condition just described until again a pulse of the reference pulse sequence TR appears, when the sequence of events above described is repeated. The range gate signal OT, accordingly, is a length modulated pulse, the duration of which varies with the vehicle speed $v_E$, it being assumed that the reaction time $T_i$ and the maximum possible braking deceleration $b_E$ for the vehicle are fixed by potentiometer settings, for example. The advantage is thus obtained that targets that are of no significance for the particular vehicle velocity can be supressed at the outset in the analysis of the echo signals, as is more fully explained below.

The range gate can additionally be made dependent upon the turning angle $\alpha$, particularly from the steering wheel arc which can readily be represented by an electrical signal, for example by means of a potentiometer. If the range limit is shortened as a suitable function of the turning angle $\alpha$, it is possible to avoid generation of false alarms, when the vehicle is going around a curve; as the result of echo signals from guard rails, signposts and the like. In an extreme case the alarm circuits can be completely turned off when the vehicle is going around a curve sharper than some appropriate threshold value.

ECHO DISCRIMINATOR

Figure 8:
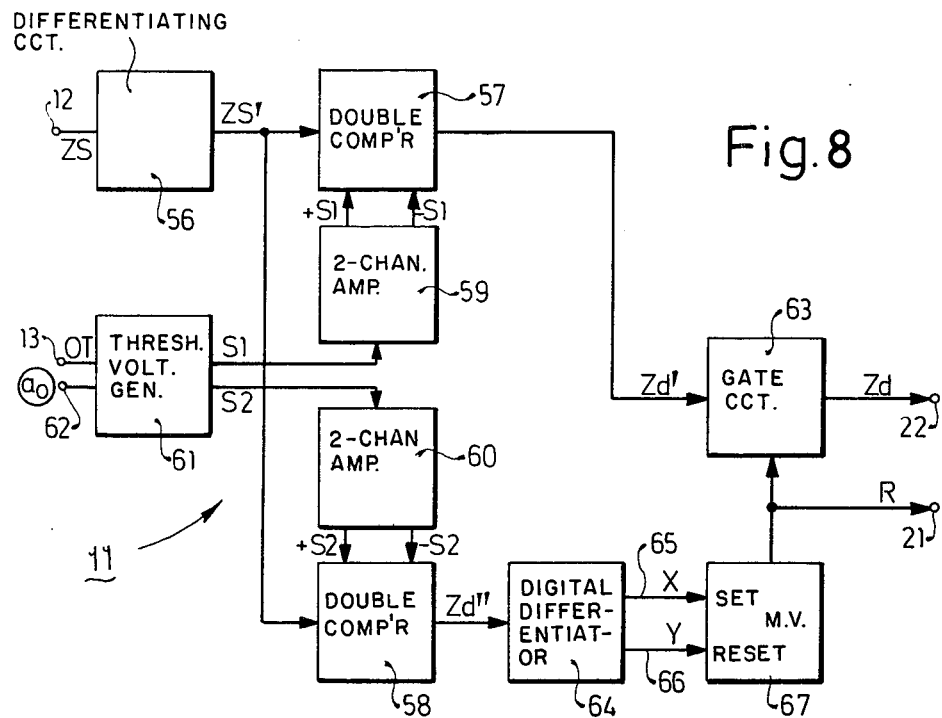
FIG. 8 is a block diagram of a echo discriminator suitable for use in the radar system in FIG. 5.

The echo discriminator 11, the components of which are shown in a block diagram in FIG. 8, comprises, as already mentioned above, a first input 12 connected to the output of the logarithmic amplifier 10 for obtaining the amplified time-expanded signal pulse sequence ZS. The pulses of this sequence are first differentiated by means of a way differentiating circuit 56. The differentiated signal pulse sequence ZS' is then supplied both to a first double comparator 57 and a second double comparator 58. The two double comparators each have two other inputs to which the respective threshold value voltages $+S_1$ and $-S_1$ in the one case and $+S_2$ and $-S_2$ in the other are supplied. These threshold value voltages are generated by the amplifiers 59 and 60 that each have two channels with amplification factors $+1$ and $-1$ respectively. Each of the amplifiers 59 and 60 has an input that is connected to one of the outputs of a threshold value voltage generator 61. The latter has a first input 62 to which a voltage $a_O$ is applied and a second input designated 13 because it is also the second input 13 of the echo discriminator 11, at which the range gate signal OT appears. In response to these signals at its two inputs 13 and 62 the circuit 61 generates two threshold voltage values $S_1$ and $S_2$ at its outputs, which vary, beginning from a maximum value after arrival of the leading edge of a range gate signal pulse, this variation being according to a function that substantially approximate the function according to which the amplitude of the echo signals vary with distance of the echo-producing target. This has the advantage that disturbance signals caused by reflections from objects of no significance located at short distances from the antenna can be supressed even when their respective amplitudes are substantially greater than the amplitudes of echoes from substantially more distant but relevant objects, of which the distance is to be measured. Furthermore, the return of the threshold voltages to their maximum values is produced by the arrival of the trailing edge of the range gate signal OT with the effect that echoes from objects lying outside the range limit defined by that signal will be supressed and be unable to provide false warnings.

As is also shown in FIG. 8, the output of the double comparator 57, at which a signal Zd' appears, is connected with the input with the input of an AND gate circuit 63. The output of the second double comparator 58 is connected with a circuit 64 that has two outputs 65 and 66. These are connected respectively with the set and reset inputs of a bistable circuit 67. The latter has an output that constitutes one output 21 of the echo discriminator 11. At this output, which is connected to the second input of the gate circuit 63, appears the time-expanded reference pulse sequence R, the generation of which is to be further explained with reference to FIG. 9. The gate circuit 63 has an output that constitutes the second output 22 of the echo discriminator 11 at which the differentiated time-expanded signal pulse sequence Zd appears.

Figure 9:
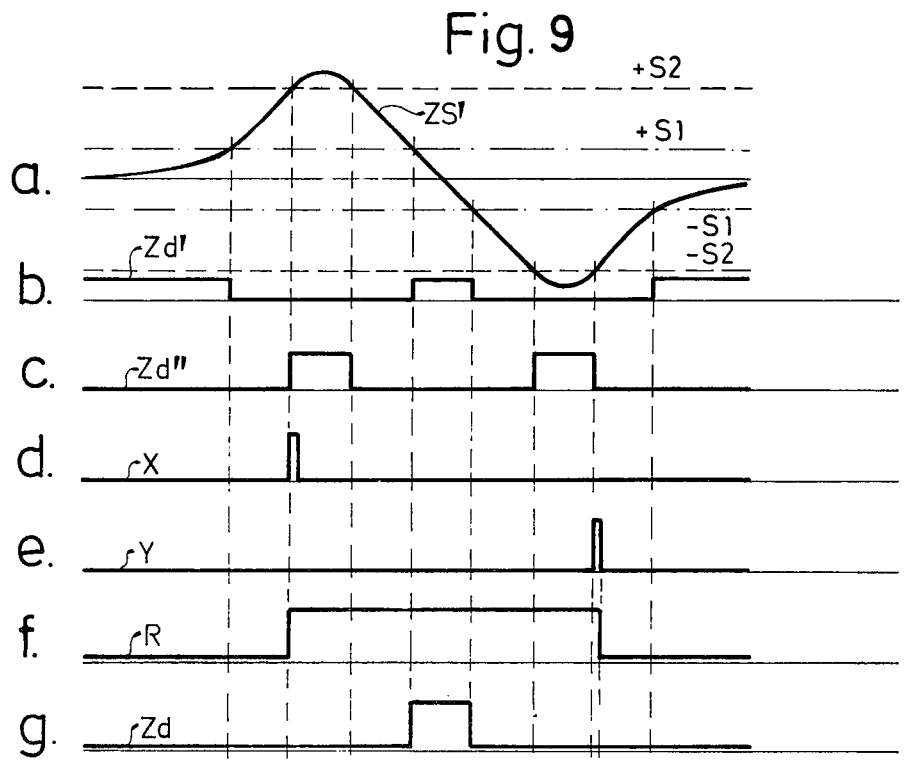
FIG. 9 is a timing diagram showing, on time axes a,b ... g on the same scale, the wave form of various signals present in the echo discriminator of FIG. 8.

The manner of operation of the two double comparators 57 and 58, the gate circuit 63, the circuit 64 and the bistable circuit 67 will now be explained with reference to the wave form diagram of FIG. 9 which the graphs a, b . . . g are related by a common time scale, with the significant instants being carried across all of them by vertical broken lines. At line a appears the wave form of a pulse of the differentiated pulse sequence ZS' which is produced by the differentiator 56 from the time-expanded pulse sequence ZS and then supplied to the two double comparators 57 and 58. The double comparator 57 works with the threshold voltages $+S_1$ and $-S_1$ and is so constituted that, as shown in line b of FIG. 9, it supplies an output signal Zd' only when the amplitude of the pulse of the differentiated pulse sequence ZS' lies between the two threshold value voltages.

The other double comparator 58 works with the two threshold value voltages $+S_2$ and $-S_2$ that are likewise drawn in around line a of FIG. 9 and this device is so constituted that it produces an output signal Zd" only when the amplitude of a pulse of the differentiated pulse sequence ZS' goes above the threshold voltage $+S_2$ or below the voltage $-S_2$, as shown on line c of FIG. 9. The second double comparator 58 thus produces for every relevant pulse of a time-expanded sequence ZS two rectangular pulses, which may be regarded as a double pulse, bracketing the relatively narrow individual pulse of the pulse sequence Zd' that relates to the passage through zero of the pulse of the differentiated pulse sequence ZS'. The circuit 64, that is preferably constituted as a digital differentiator, produces from each double pulse of the pulse sequence Zd" a set pulse x at the output 65, shown on line d of FIG. 9, and a reset pulse y at output 66, shown on line e of FIG. 9, these last two pulses being used to operate the bistable circuit 67. In the interval between a set pulse x and a succeeding reset pulse y the bistable circuit 67 delivers a pulse of the limited (that is, rectangularly shaped) time-expanded reference pulse sequence R which is supplied on one hand to the input 23 of the target analysis logic circuit 26 and on the other hand to the gate circuit 63 to hold the latter open, so that at its output 22 a pulse of the differentiated signal pulse sequence Zd can be produced. The circuit arrangement just described prevents an overshoot of an individual pulse of the differentiated pulse sequence ZS' from generating an additional pulse of the differentiated sequence Zd that does not correspond to a maximum of an individual pulse of the time-expanded signal pulse sequence ZS.

TARGET ANALYSIS LOGIC CIRCUIT

The purpose of the logic circuit 26 (FIG. 5) is to obtain length modulated target distance pulses $Z_1$, each of which begin at an instant that corresponds exactly to the beginning of a new measuring interval, and ends at an instant that corresponds exactly with the reception of an echo pulse from the nearest target, without allowing the time lapses in the individual circuit blocks of the radar system to spoil the accuracy of the measurement.

The beginning of each measurement interval is determined by the first pulse of the pulse sequence Zd that corresponds to the start pulse $ZE_o$. The end of the length modulated target distance pulse $Z_1$ is determined by the pulse of the pulse sequence Zd that corresponds to the first echo pulse $ZE_1$ (FIG. 2). This manner of operation has the advantage that the separation in time of the start pulse and the echo pulse, and hence the length of the target distance pulse $Z_1$ is entirely independent of any propagation time in the previously described circuit portions, which is particularly important because such propagation times can change, for example under the influence of temperature, ageing effects and so on.

The target analysis logic circuit 26 also produces the pulses $ZP_1$ which appear at the end of every target distance pulse $Z_1$.

The integrator control circuit 34 (FIG. 5) provides a signal $F_1$ that results from a time comparison of the range gate signal OT and the target range signal ZP1. Its output signals $UV_1$ and $Ud_1$ are respectively representative of the approach velocity and distance of a target. The circuits for these determinations are conventional. These values are used to permit the hazard estimator 15 to produce a warning signal perceptible to the driver only if the distance to the target vehicle is not only less than a certain maximum but also has a desired relation to the speeds of the two vehicles. The signals from the circuit 34 furnished to the hazard estimator 15 do not affect the formation, in the portion 15a of the hazard estimator, of the signal provided to the range gate 14.

Though the invention has been described with reference to a particular illustrative embodiment, it will be understood that modifications and variations are possible within the inventive concept.

We claim:

1. A method of processing radar echo pulse sequences having steep pulse flanks and a predetermined sequence frequency, comprising the steps of:
   generating an auxiliary pulse sequence of a sequence frequency that differs slightly from said predetermined sequence frequency;
   multiplying the pulses of a radar echo pulse sequence by the pulses of said auxiliary pulse frequency;
   integrating the product signal produced by the multiplying step and thereby suppressing high frequency signal components and obtaining time-expanded radar signals, and
   utilizing said time-expanded radar signals for control of indicator means as if said time-expanded signals were directly detected radar signals.

2. A method as defined in claim 1, in which the step of generating an auxiliary pulse sequence is carried out by generating auxiliary pulses at a frequency which differs from said predetermined frequency so little that at recurring intervals a plurality of successive pulses of said radar echo pulse sequence are overlapped in time by successive pulses of said auxiliary pulse sequence.

3. A method as defined in claim 2, in which the step of generating an auxiliary pulse sequence is carried out by generating pulses of an individual pulse duration that does not exceed the duration of the radar pulses of said radar echo pulse sequence.

4. A method as defined in claim 2, in which there are also performed the steps of:
   differentiating the individual pulses of said time-expanded radar signals produced by the integrating step;
   producing a pulse amplitude selection gate signal by reference to first positive and negative threshold voltages whenever one of said differentiated time-expanded signals exceeds both said first threshold voltages;
   producing a null passage pulse for each of said differentiated time-expanded signals by reference to second positive and negative threshold voltages closer to zero voltage than said first threshold voltages, whenever one of said differentiated time-expanded signals exceeds both said second threshold voltages, and
   selecting for processing only those of said null passage pulses which occur during the presence of one of said pulse amplitude selection gate signals.

5. In a pulse radar system which comprises means for generating and transmitting radar pulses, for receiving radar echo pulses and for evaluating or displaying a relation of the time of arrival of echo pulses and the time of transmission of corresponding radar pulses, the improvement which consists of the provision of:
   a time scale expansion circuit interposed between the means for receiving radar echo pulses and the means for evaluating or displaying a relation of the time of arrival of echo pulses and the time of transmission of corresponding radar pulses, which time scale expansion circuit comprises oscillator means for generating an auxiliary pulse sequence having a pulse repetition rate differing slightly from that of said transmitted radar pulses, a multiplier circuit having one input connected to the output of the radar pulse receiver and another input connected to the output of said auxiliary pulse sequence oscillator means, an integrator having its input connected to the output of said multiplier circuit and having an output supplying a sequence of radar echo pulses of expanded time scale.

6. An improvement in a radar system as defined in claim 5, in which said radar system includes a master oscillator for controlling the transmission of radar pulses and in which a second time scale expansion circuit is provided having as an input, pulses corresponding in time to transmitted radar pulses and comprising a second multiplier circuit having a first input connected to the output of said master oscillator and a second input connected to the output of said auxiliary pulse sequence oscillator means, and also comprising a second integrator having its input connected to the output of said second multiplier and its output supplying a sequence of references pulses of expanded time scale for comparison with the output of said first integrator.

7. An improvement in a radar system as defined in claim 6, in which the means of the radar system for evaluating or displaying a relation of the time of arrival of echo pulses and the time of transmission of corresponding radar pulses is constituted by means for comparing said time of arrival with a critical time represented by an electrical signal produced by a variable range gate circuit comprised in said comparing means and connected so as to be triggered by pulses provided by the output of said second multiplier, said variable range gate generating circuit having another input at which an electrical signal representing the value of a critical time lapse is provided for contributing to the timing of the output of said variable range gate generating circuit.

8. An improvement in a radar system as defined in claim 5, in which there are provided echo amplitude discriminator means having as an input the time-expanded echo pulse output of said integrator, said echo amplitude discriminator means including:

a differentiating circuit for differentiating the time-expanded echo pulses from the output of said integrator and producing therefrom waveforms each having a positive half wave and a negative half wave;

means for comparing two positive voltage thresholds with the positive half wave portion of the output of said differentiating circuit and for comparing two negative voltage thresholds with the negative half wave portions of the output of said differentiating circuit, and means for producing, from the outputs of said comparing means, a sequence of pulses each of a duration corresponding to the sum of the durations of peak portions respectively of the positive and negative half waves of one of said waveforms and of the transition of that waveform between said peak portions and for producing also from the output of said comparing means a sequence of shorter pulses indicative of the timing of the mid-portion of said transition waveform.

* * * * *